United States Patent [19]
Rockwell

[11] 3,912,020
[45] Oct. 14, 1975

[54] RENEWABLE SELF-SHARPENING RIPPER TOOTH

[75] Inventor: Harvey Whiting Rockwell, Springfield, Ill.

[73] Assignee: Fiat-Allis Construction Machinery, Inc., Deerfield, Ill.

[22] Filed: Apr. 1, 1974

[21] Appl. No.: 456,661

[52] U.S. Cl. .............. 172/699; 172/713; 172/719; 172/724; 37/142 R
[51] Int. Cl.[2] ........................................ A01B 13/08
[58] Field of Search .......... 172/699, 700, 713, 719, 172/734, 735, 737; 37/142 R, 142 A

[56] References Cited
UNITED STATES PATENTS

| | | | |
|---|---|---|---|
| 430,166 | 6/1890 | Bauman | 172/724 |
| 623,645 | 4/1899 | Young | 172/713 |
| 2,160,964 | 6/1939 | Godfrey | 172/713 |
| 2,269,724 | 1/1942 | Linkogel | 172/699 X |
| 2,284,178 | 5/1942 | Sublett | 172/699 X |
| 2,787,202 | 4/1957 | Gladis | 172/699 X |
| 2,796,012 | 6/1957 | Botha | 172/699 |
| 3,207,232 | 9/1965 | Bechman | 172/699 X |
| 3,601,911 | 8/1971 | Wood | 37/142 R |
| 3,704,753 | 12/1972 | Hasforth et al. | 37/142 R X |
| 3,823,496 | 7/1974 | Querci et al. | 37/142 A |

FOREIGN PATENTS OR APPLICATIONS

| | | | |
|---|---|---|---|
| 872,491 | 2/1942 | France | 172/719 |

*Primary Examiner*—Stephen C. Pellegrino

[57] ABSTRACT

A ripper shank drawn by a tractor has a combined ripper tooth and shank guard releasably and adjustably mounted thereon by meens of a pair of vertically spaced apart removable pins which engage pin holes in the shank and registering pin holes in the tooth. The tooth, which is curved, uniformly cross-sectioned and initially about twice as long as that portion thereof which penetrates the material to be ripped, can be advanced downwardly along the shank (when the pins are removed) to compensate for wear at the lower tip of the tooth, thereby extending the useful life of the tooth. The tooth is provided with a series of equally spaced apart pin holes or openings along its length. The shank is provided with a pair of widely spaced apart pin holes or openings which will always register with some pair of pin holes or openings in the tooth, depending on tooth position. The shank is also provided with a series of additional pry bar holes arranged between the shank pin holes for accommodating a pry bar used to move the tooth with respect to the shank. The number of pin holes in the tooth between the pin holes actually available for use by the pins differs (i.e., is greater than) the number of pry bar holes in the shank so that misregistration occurs and pry bar leverage can be obtained.

23 Claims, 7 Drawing Figures

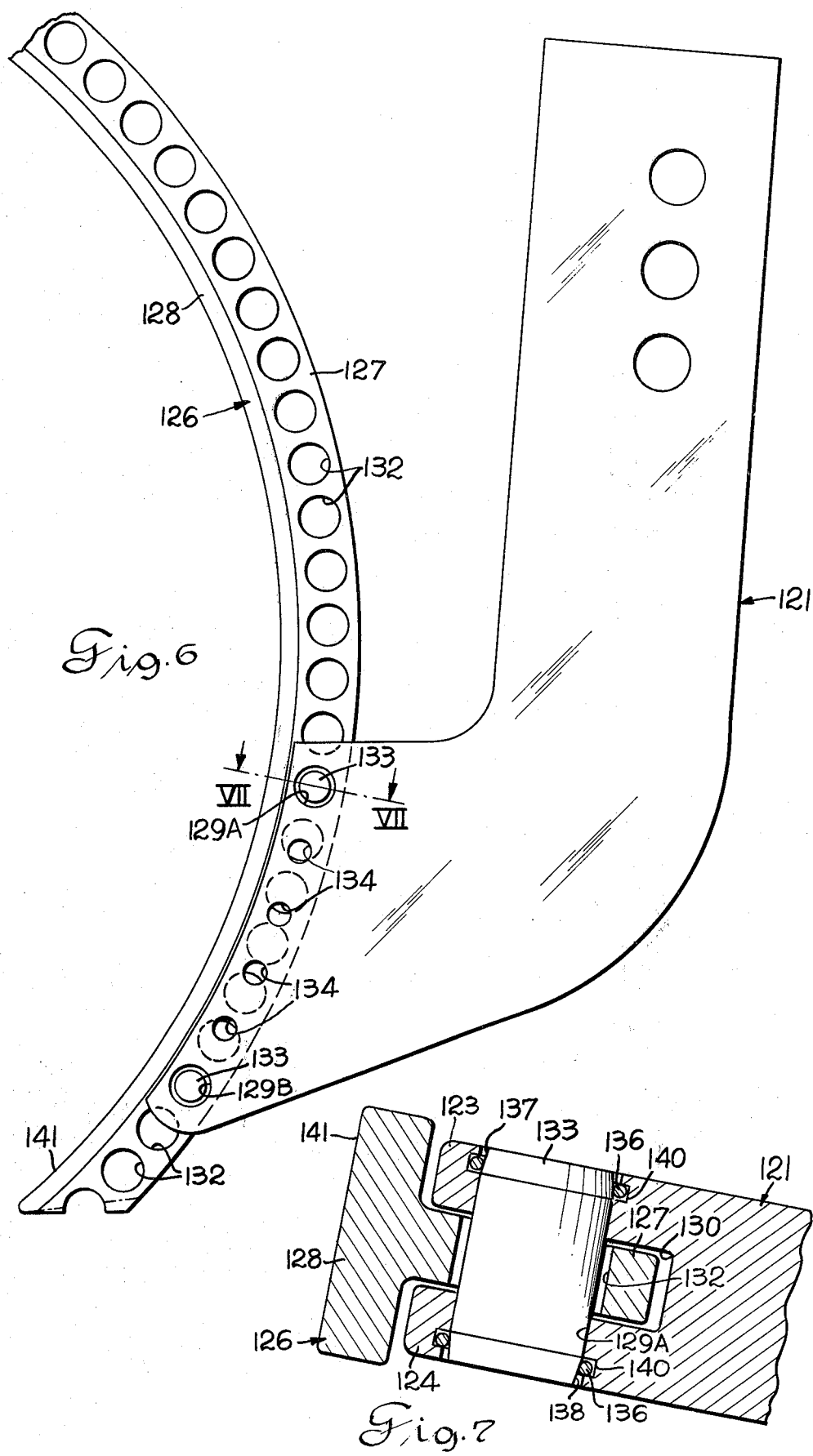

3,912,020

RENEWABLE SELF-SHARPENING RIPPER TOOTH

BACKGROUND OF THE INVENTION

Heretofore various renewable point rippers have been suggested in the prior art. U.S. Pat. Nos. 3,550,591; 3,565,182 and 3,659,654 show adjustable ripper tips. However, these patents do not show a ripper tooth in protecting relation to leading edge of the ripper shank. Some adjustable teeth and plow leading edges have been suggested by the following patents in the agricultural art: U.S. Pat. Nos. 2,312,271; 2,796,012; 1,916,833; 949,492; 2,312,372; 430,166; 4,493; 2,160,964 and 623,645.

BRIEF DESCRIPTION OF THE INVENTION

An elongated combined ripper tooth and shank guard is adjustably connected to the ripper shank in a manner permitting it to be advanced downwardly in relation to the shank as the lower end of the tooth wears away. A substantial portion of the ripper tooth is consumed during its life since it is of considerably greater length than that portion that initially penetrates the ground when the ripper is in its ripping position. The pin openings on the rearwardly extending portion of the ripper tooth are so spaced in relation to openings in the shank that a pry bar may be used to advance the tooth downwardly. The openings in the rearwardly extending portion of the tooth also contribute to a proper self-sharpening of the tooth as it wears away at the tip. A curved tooth configuration provides a proper angle for the earth penetrating tip and the ripper tooth curves upwardly in front of the tool bar to which the ripper shank is attached. In one embodiment, a rearwardly rpojecting portion of the tooth comprises a groove of C-shaped cross section which slidably engages a generally cylindrical forwardly projecting arcuate tooth mounting portion at the lower front edge of the shank. In another embodiment, a rearwardly projecting portion of the tooth extends into and slidably engages a groove in the forwardly projecting arcuate tooth mounting portion at the lower front edge of the shank.

BRIEF DESCRIPTION OF THE DRAWINGS

Two embodiments of the invention are shown in the attached drawings wherein:

FIG. 6 is a side view of a second embodiment of the present invention.

FIG. 7 is a section view taken along the line VII—VII in FIG. 6.

DETAILED DESCRIPTION OF THE INVENTION

Figure 1:
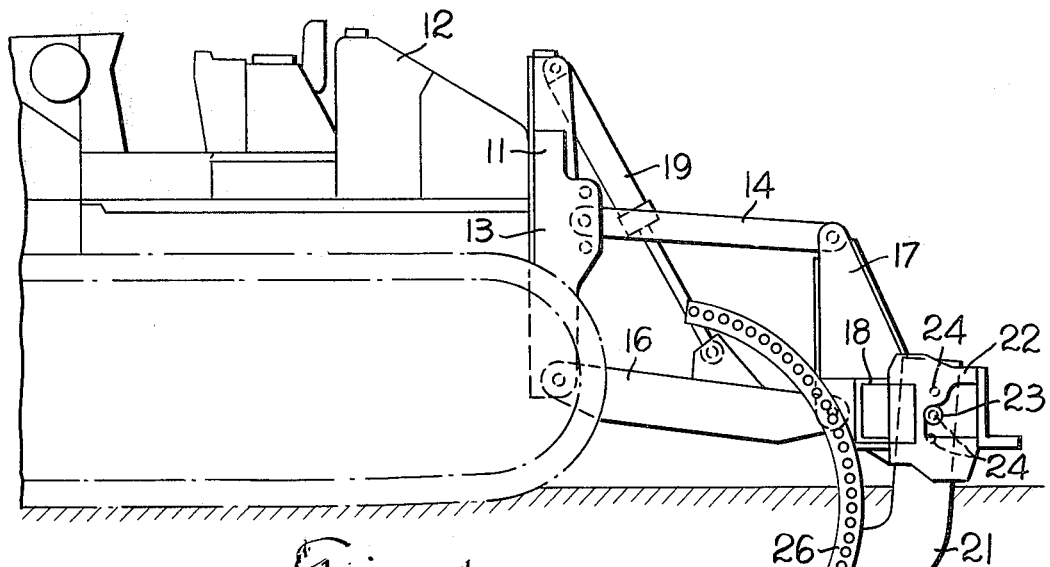
FIG. 1 is a side view of a ripper incorporating the present invention attached to a crawler tractor.
Figures 2, 3:
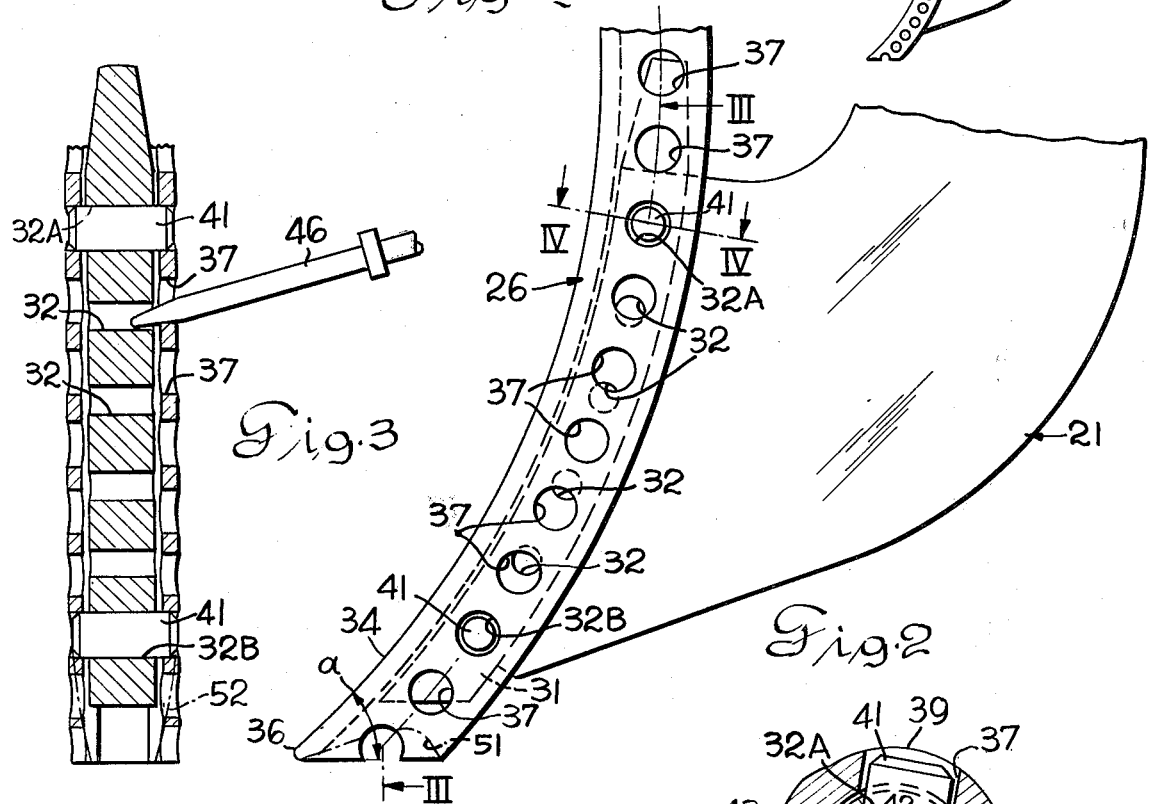
FIG. 2 is an enlarged view of that portion of the ripper shown in FIG. 1 concerned with connection of the ripper tooth to the shank.
FIG. 3 is a section view taken along the line III—III in FIG. 2.
Figure 5:
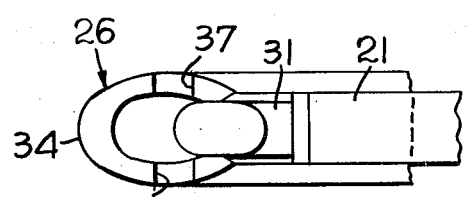
FIG. 5 is a bottom view of a portion of the ripper shown in FIG. 2.

Referring to FIG. 1, a ripper attachment 11 is connected by releasable fastening means (not shown) to a crawler tractor 12. The ripper attachment 11 includes a bracket 13, a pair of rearwardly extending links 14, 16, an upright standard 17, a transverse tool bar 18 and a double-acting hydraulic jack 19 interconnected between the lower link 16 and the bracket 13. A ripper shank 21 is releasably connected to a support bracket 22 welded to the transverse tool bar 18. The shank 21 is releasably secured to the support bracket 22 by a transverse connecting pin 23 which extends through one of three transverse mounting holes 24 in the shank 21. Thus, the shank 21 may be raised or lowered relative to the tool bar 18 by aligning the pin 23 with the appropriate one of the holes 24. Up to this point, the description relates to conventional construction.

The lower forward part of the ripper shank 21 is of an appropriate configuration to receive a novel ripper tooth 26 having a ripper point portion 36 and a shank portion. The ripper tooth 26 is advanceable as wear occurs, thereby providing a substantially consumable ripper tooth.

Figure 4:
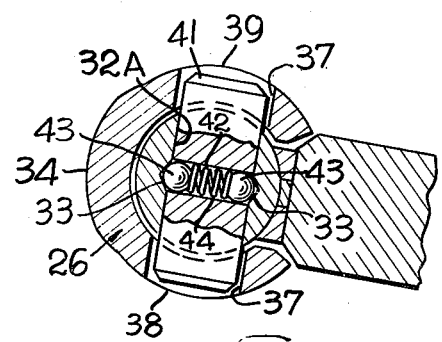
FIG. 4 is a section view taken along the line IV—IV in FIG. 2.

Referring to FIGS. 2 through 5, a curved circular section bar 31 is secured by welding to the front part of the ripper shank 21. It will be noted that the ripper shank 21 is relatively narrow width and is of substantial dimension in the fore and aft direction. This provides sufficient strength for the shank in its earth-ripping operation. A plurality of equally spaced transverse holes or openings 32 are formed in the ripper tooth mounting portion 31 of the shank 21. The uppermost and lowermost of these holes, designated 32A and 32B, respectively, are pin holes and have grooves 33 formed in the walls thereof, as shown in FIG. 4. The leading edge 34 of the arcuately formed ripper tooth 26 may be appropriately hardened to provide satisfactory wear characteristics. It will be noted that the ripper tooth 26 terminates at its lower end in a ripper point configuration 36 and the penetration angle a is sufficiently acute to achieve proper material penetration characteristics. The curvature of the ripper tooth 26 is such that the tooth will pass forwardly to the tool bar 18, as shown in FIG. 1, and may be of substantial length, as will be noted in FIG. 1, so that the tooth forms approximately 120 degrees of a full circle. Viewed in another way, the tooth 26 is more than twice the length of that portion thereof that is normally in earth penetrating position during a ripper operation; this condition being shown in FIG. 1. As shown in FIG. 4, the cross section of tooth 26 is substantially uniform except for the interruption by pairs of aligned openings 37 which are circumferentially spaced along the curved side walls 38, 39 of the ripper tooth. This permits the ripper tooth to be manufactured by extrusion or machining, as may be most convenient. The uppermost and lowermost transverse holes 32A and 32B, respectively, have installed therein movable pins 41, each of which has a transverse hole 42 therethrough for receiving a pair of detents or balls 43 and a compression spring 44. As shown in FIG. 4, the pin 41 is in its detented installed position whereby the outer portions thereof extend into aligned openings 37 in the side walls of the ripper tooth 26. The openings 37 are spaced at such intervals in a circumferential manner so as to register with the uppermost and lowermost openings 32A and 32B, respectively, formed in the shank 21. It will be noted that the spacing of openings 32 (including 32A and 32B) is different from the spacing of openings 37. This difference in spacing is provided so as to permit a pry bar tool 46, shown in FIG. 3, to be inserted through an appropriate opening 37 into an appropriate opening 32 to pry the tooth 26 downwardly relative to shank 21 to its next adjustable position when sufficient wear occurs at the lower end of tooth 26 to merit downward adjustment of the tooth. It is to be understood that the pins 41, shown in FIG. 3, would be removed before the prying operation were actually undertaken. After the tooth 26 has been advanced downwardly a short distance, the tool bar 46 may be installed in other partially registering openings 37, 32 to provide a proper prying operation to advance the tooth. After the tooth 26 has been moved downwardly through a distance corresponding to the spacing between a pair of adjacent openings 37 (or some multiple thereof), the releasable locking pins 41 are reinstalled. A typical wear pattern of the lower end of tooth 26 is shown in dash lines 51, 52 in FIGS. 2 and 3.

Referring to FIGS. 6 and 7, wherein a second embodiment of the present invention is illustrated, it will be noted that the elongated ripper tooth 126 is of a generally T-shaped cross sectional configuration and has a single mounting portion or flange 127 extending rearwardly from and integrally formed with the forward ground engaging portion 128. As shown in FIG. 7, the forward portion of the ripper shank 121 has a pair of forwardly extending mounting flanges 123, 124 defining an arcuate groove 130 therebetween into which the rearwardly extending mounting portion 127 of the tooth 126 projects. These complementary parts are interconnected by releasable connecting means in the form of pins 133 installed in the uppermost and lowermost openings 129 and 129B, respectively, in the mounting portions 123, 124 of the ripper shank 121. The pin 133 extends through openings 132 in tooth 126 formed at evenly spaced intervals along a constant radius arc corresponding to the arcuate configuration of the tooth 126. At least one of the forwardly projecting mounting portions 123, 124 contains a series of additional pry bar openings 134 and, as illustrated in FIG. 6, such openings 134 are formed in the mounting portion 123, 124. These pry bar openings 134 are spaced apart at different intervals than the center spacing of the openings 132 of the ripper tooth 126, thereby facilitating movement of the tooth 126 downwardly by a pry bar, as hereinbefore explained, to a new position when the tooth wears to a predetermined extent. The locking pin 133 is held in place by a pair of snap rings or releasable retaining rings 136 which engage grooves 140 formed in the mounting portion 123, 124 of the ripper shank 121 and act against tapered conical surfaces or shoulders 137, 138 on opposite ends of the pin 133. A wear-hardened surface 141 may be provided on the leading edge of the ripper tooth 126, as by heat treatment or the suitable depositing of material as by welding.

As is apparent, the transverse dimension or width of the forward ground engaged portion 34 and 128 of the teeth 26 and 126, respectively, is greater than the transverse dimension or width of the shank 21 and thus serves to protect the shank against wear.

I claim:

1. A ripper comprising:
    a vertically disposed shank having a front edge and a rear edge, with the distance between said edges being several times greater than the width of said shank, said shank having a forwardly projecting arcuate tooth mounting portion at its lower front edge, said mounting portion being provided with a pair of vertically spaced apart transverse pin receiving holes,
    an arcuate tooth of substantially constant transverse cross sectional configuration, said tooth comprising a forward portion wider than said shank and a rearwardly projecting portion, one of either said tooth mounting portion or said rearwardly projecting portion being provided with a groove and the other of said tooth mounting portion or said rearwardly projecting portion being provided with a projection which engages said groove so that said rearwardly projecting portion of said tooth is slidably engaged with said mounting portion of said shank,
    said rearward portion of said tooth being provided with a plurality of transverse pin receiving holes circumferentially spaced from each other along the length of said tooth and selectively alignable with said pair of pin receiving holes in said shank as said tooth is adjusted relative to said shank as the lower end of said tooth wears away,
    and a pair of flush-mounted pins for releasably securing said tooth to said shank, each pin being releasably engageable with a pin receiving hole in said shank and a pin receiving hole in said tooth.

2. A ripper according to claim 1 wherein said rearwardly projecting portion of said tooth comprises a groove which slidably engages said forwardly projecting arcuate tooth mounting portion at the lower front edge of said shank.

3. A ripper according to claim 2 wherein said groove and said tooth mounting portion each have a cross sectional configuration which is substantially cylindrical.

4. A ripper according to claim 1 wherein said rearwardly projecting portion of said tooth extends into and slidably engages a groove defined by a pair of transversely spaced apart flanges on said forwardly projecting arcuate tooth mounting portion at the lower front edge of said shank.

5. A ripper according to claim 2 wherein each of said pin receiving holes in said shank comprises a detent groove and wherein each of said pins comprises spring biased detent means for engagement with said detent groove for releasably maintaining said pin in position.

6. A ripper according to claim 4 wherein each of said pin receiving holes in said shank comprises at least one detent groove, wherein each of said pins comprises a shoulder, and further comprising at least one releasable retaining ring engaging said detent groove and said shoulder for releasably maintaining said pin in position.

7. A ripper according to claim 1 including a plurality of spaced apart pry bar holes in said shank arranged between said pin receiving holes in said shank, said pair of pin receiving holes in said shank being adapted to register with a non-adjacent pair of pin receiving holes in said tooth, at least some of the pin receiving holes in said tooth between said non-adjacent pair of pin receiving holes being partly out of registry with said pry bar holes in said shank to facilitate prying action between said tooth and said shank by means of a prying tool, and wherein the number of pin receiving holes in said tooth between said non-adjacent pair of pin receiving holes differs from the number of pry bar holes in said shank.

8. A ripper according to claim 7 wherein said number of pin receiving holes is greater than said number of pry bar holes.

9. A ripper according to claim 8 wherein said pin receiving holes in said tooth are equidistantly spaced and wherein said pry bar holes and said pin receiving holes in said shank are equidistantly spaced.

10. A ripper comprising:
a pair of members including a shank and a tooth releasably mounted on said shank by pins and adjustably movable with respect to said shank by means of a prying tool, said shank and said tooth having surfaces which mate when said tooth is mounted on said shank, said shank having a pair of vertically spaced apart pin holes which extend inwardly from said surface of said shank and a plurality of spaced apart pry bar holes between said pin holes, which pry bar holes extend inwardly from said surface of said shank;
said tooth being elongated and having a plurality of vertically spaced apart pin holes which extend inwardly from said surface of said tooth;
the holes in at least one of said members extending through said one member to an outer surface thereof so as to facilitate insertion of said pins or said prying tool;
said pair of pin holes in said shank being adapted to register with a non-adjacent pair of pin holes in said tooth;
at least some of the pin holes in said tooth between said non-adjacent pair of pin holes being partly out of registry with said pry bar holes in said shank to facilitate prying action between said tooth and said shank by means of said prying tool;
and a pair of pins for releasably and adjustably securing said tooth to said shank, each pin being releasably engageable with a pin hole in said tooth and a pin hole in said shank.

11. A ripper according to claim 10 wherein the number of pin holes in said tooth between said non-adjacent pair of pin holes differs from the number of pry bar holes in said shank.

12. A ripper according to claim 11 wherein said number of pin holes is greater than said number of pry bar holes.

13. A ripper according to claim 12 wherein said pin holes in said tooth are equidistantly spaced and wherein said pry bar holes and said pin holes in said shank are equidistantly spaced.

14. A ripper according to claim 13 wherein said tooth is arcuate in shape and wherein said shank comprises a correspondingly shaped portion with which said tooth mates.

15. A ripper comprising:
a vertically disposed shank having a front edge and a rear edge, with the distance between said edges being several times greater than the width of said shank, said shank having a forwardly projecting arcuate tooth mounting portion at its lower front edge, said mounting portion being provided with a pair of vertically spaced apart transverse pin receiving holes and a plurality of vertically spaced apart transverse pry bar holes arranged between said pin receiving holes,
an arcuate tooth of substantially constant transverse cross sectional configuration, said tooth comprising a forward portion and a rearwardly projecting portion, said rearwardly projecting portion of said tooth being slidably engaged with said mounting portion of said shank,
said rearward portion of said tooth being provided with a plurality of transverse pin receiving holes circumferentially spaced from each other along the length of said tooth, said pair of pin receiving holes in said mounting portion of said shank being adapted to register with a non-adjacent pair of pin receiving holes in said tooth as said tooth is adjusted relative to said shank as the lower end of said tooth wears away,
at least some of said pin receiving holes in said tooth between said non-adjacent pair of pin receiving holes being partly out of registry with said pry bar holes in said mounting portion of said shank to facilitate prying action between said tooth and said shank by means of a prying tool,
and a pair of pins for releasably securing said tooth to said shank each pin being releasably engageable with one of said pin receiving holes in said mounting portion of said shank and a pin receiving hole in said tooth.

16. In a ripper comprising a pair of members including a vertically disposed shank and a vertically disposed tooth mounted at the front of said shank by a removable pin, said tooth being vertically adjustable with respect to said shank by means of a pry bar when said pin is removed, said shank having a surface which mates with a surface of said tooth, a plurality of vertically spaced apart holes extending inwardly from said surface of said shank, a plurality of vertically spaced apart holes extending inwardly from said surface of said tooth, the holes in at least one of said members extending through said one member to an outer surface of said one member so as to facilitate insertion of said pin or said pry bar, said holes in said pair of members being arranged so that when a hole in said shank registers with a hole in said tooth at least one other hole in said shank is partly out of registry with at least one other hole in said tooth, and a removable pin insertable into engagement with any of said holes which are in registry to secure said tooth to said shank, said holes which are out of registry being adapted to accommodate a pry bar for effecting vertical adjustment of said took relative to said shank when said pin is removed.

17. A ripper according to claim 16 wherein the number of holes in said tooth differs from the number of holes in said shank.

18. A ripper according to claim 17 wherein said number of holes in said tooth is greater than said number of holes in said shank.

19. A ripper according to claim 18 wherein said holes in said tooth are equidistantly spaced and wherein said holes in said shank are equidistantly spaced.

20. A ripper according to claim 19 wherein said tooth is arcuate in shape and wherein said shank comprises a correspondingly shaped portion with which said tooth mates.

21. A ripper comprising:
a vertically disposed shank having a front edge and a rear edge, with the distance between said edges being several times greater than the width of said shank, said shank having a forwardly projecting arcuate tooth mounting portion of substantially cylindrical cross sectional configuration at its lower front edge, said mounting portion being provided with a pair of vertically spaced apart transverse pin receiving holes, an arcuate tooth of substantially constant transverse cross sectional configuration, said tooth comprising a forward portion wider than said shank and a rearwardly projecting portion, said rearwardly projecting portion of said tooth having a groove of substantially cylindrical cross sectional configuration being slidably engaged with said mounting portion of said shank, said rearward portion of said tooth being provided with a plurality of transverse pin receiving holes circumferentially spaced from each other along the length of said tooth and selectively alignable with said pair of pin receiving holes in said shank as said tooth is adjusted relative to said shank as the lower end of said tooth wears away, and a pair of flush-mounted pins for releasably securing said tooth to said shank, each pin being releasably engageable with a pin receiving hole in said shank and a pin receiving hole in said tooth.

22. A ripper comprising:

a vertically disposed shank having a front edge and a rear edge, with the distance between said edges being several times greater than the width of said shank, said shank having a forwardly projecting arcuate tooth mounting portion at its lower front edge, said mounting portion having a groove defined by a pair of transversely spaced apart flanges and being provided with a pair of vertically spaced apart transverse pin receiving holes, an arcuate tooth of substantially constant transverse cross sectional configuration, said tooth comprising a forward portion wider than said shank and a rearwardly projecting portion, said rearwardly projecting portion of said tooth extending into and being slidably engaged with said groove in said mounting portion of said shank, said rearward portion of said tooth being provided with a plurality of transverse pin receiving holes circumferentially spaced from each other along the length of said tooth and selectively alignable with said pair of pin receiving holes in said shank as said tooth is adjusted relative to said shank as the lower end of said tooth wears away, and a pair of flush-mounted pins for releasably securing said tooth to said shank, each pin being releasably engageable with a pin receiving hole in said shank and a pin receiving hole in said tooth.

23. A ripper according to claim 22 wherein each of said pin receiving holes in said shank comprises at least one detent groove, wherein each of said pins comprises a shoulder, and further comprising at least one releasable retaining ring engaging said detent groove and said shoulder for releasably maintaining said pin in position.

* * * * *